Feb. 15, 1949.                W. ARMSTRONG                2,461,802
          APPARATUS AND METHOD FOR DETECTING AND
           MEASURING RADIANT ENERGY FOR LOCATING
              SUBTERRANEAN PETROLEUM DEPOSITS
                 Original Filed March 6, 1945
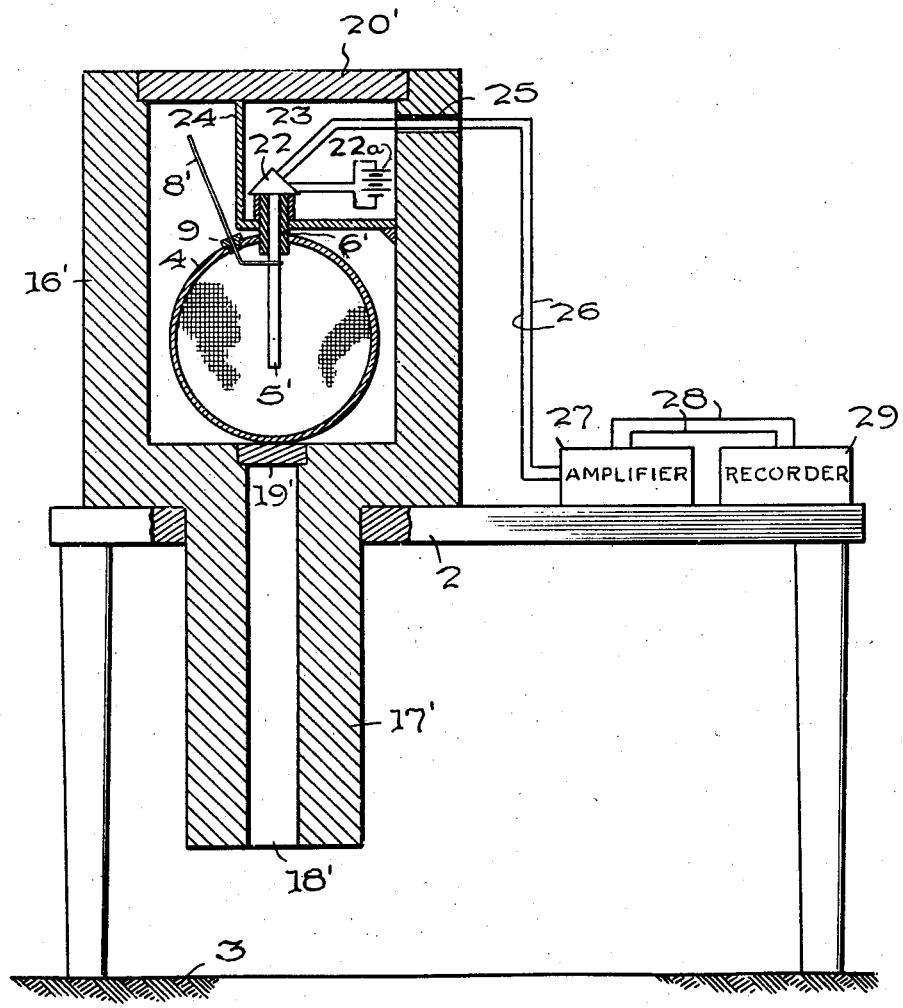
Inventor
WALTER ARMSTRONG
By John B. Brady
          Attorney Patented Feb. 15, 1949

2,461,802

UNITED STATES PATENT OFFICE 2,461,802

APPARATUS AND METHOD FOR DETECTING AND MEASURING RADIANT ENERGY FOR LOCATING SUBTERRANEAN PETROLEUM DEPOSITS

Walter Armstrong, Washington, D. C.

Original application March 6, 1945, Serial No. 581,280. Divided and this application September 20, 1945, Serial No. 617,588

6 Claims. (Cl. 250—83.6)

This invention relates to the prospecting for subterranean petroleum deposits by providing an apparatus and method for the detection and measurement of relative values of a penetrating radiant energy which emanates from subterranean petroleum deposits and passes through the intervening earth strata to the surface of the earth.

This application is a division of my application Serial Number 581,280 filed March 6, 1945 for "Apparatus for detecting and measuring radiant energy for locating subterranean petroleum deposits" which is a continuation-in-part of my co-pending application Serial No. 547,940 filed August 3, 1944, entitled "Method of detecting and measuring radiant energy for locating subterranean petroleum deposits."

I have found that the penetrating radiant energy emanating from subterranean petroleum deposits which reaches the earth's surface is proportional to the nature and amount of the subterranean petroleum deposit and the intervening earth strata. Because of the varied nature and intensities of this energy encountered in the various locations to be explored, various types of apparatus have been designed.

Through my construction and trial of apparatus I have learned that a negative electrostatic charge, when placed on the inner walls of a suitably shielded ionization chamber constructed of inactive material, has the peculiar property of uniting with electrons produced on the inner walls of the ionization chamber. I have also learned that when additional electrons, resulting from the penetration of external radiation to the inner walls of the shielded ionization chamber, are contacting the initially negatively electrostatically charged inner walls, these additional electrical charges on the inner walls will produce corresponding charges of the opposite polarity, or positive charges, on the ionization chamber electrode.

These principles in the field of molecular and electron physics have been fully disclosed in my co-pending application Serial No. 547,940 filed August 3, 1944, entitled "Method of detecting and measuring radiant energy for locating subterranean petroleum deposits." My invention provides a method and apparatus for utilization of the radiant energy emanating from subterranean petroleum deposits, for field use in petroleum prospecting.

In my apparatus I use an ionization chamber in an inclosing shield which shields the ionization chamber from earthly ionizing radiation incident upon the shield in geophysical explorations, such as alpha, beta, and gamma, as well as other ionizing radiation associated with the penetrating radiant energy emanating from subterranean petroleum deposits, all of which radiation accelerates the discharge of an ionization chamber charge. The inclosing shield, except for a portion of the shield between the ionization chamber and the earth's surface, also shields the ionization chamber against radiant energy emanating from subterranean petroleum deposits encountered in geophysical explorations. The apparatus of this invention also provides structure and means for the electronic determination of the ionization chamber charge during the operation of the apparatus.

The penetrating radiant energy which emanates from subterranean petroleum deposits which I detect and measure by the apparatus of my invention, has penetrating properties far greater than the above-described ionizing radiation which accelerates the discharge of an ionization chamber charge, and because of the great penetrating properties of the radiant energy reaching the earth's surface from subterranean deposits of petroleum, the petroleum deposit emanations penetrate through the inclosing shield provided in my apparatus for shielding the ionization chamber from the ionizing radiation, encountered in geophysical explorations, that accelerates the discharge of an ionization chamber charge. The petroleum deposit emanations when penetrating the shielding above a recess in the inclosing shield and on to the inner walls of the ionization chamber on which there has been placed a negative electrostatic charge, will cause additional electrons, or negative charges, to adhere to the already initially negatively electrostatically charged inner walls. These added charges to the inner walls will cause a retardation in the dissipation or decay of the ionization chamber charge. Thus I have shown that the ionization chamber in my apparatus is used for the purpose of affording a shielded negatively electrostatically charged surface for collecting electrons, or negative charges, thereon, which additional charges on the inner walls of the ionization chamber are caused by the penetration to the ionization chamber of the penetrating radiant energy reaching the earth's surface from subterranean petroleum deposits.

The principal object of this invention is to provide an apparatus and method employing electronic means for use in directly locating subterranean petroleum deposits by utilizing the penetrating energy which emanates from subterranean petroleum deposits thereby reducing exploration costs.

Another object of my invention is to provide recorded measurements of the changes in the ionization chamber electrode charge in all field exploration work.

The method of my invention will be more fully understood from the specification hereinafter following by reference to the accompanying drawing which illustrates a vertical sectional view of the exploratory apparatus embodying my invention and schematically shows the association of an electronic amplification system and recorder with the exploratory apparatus.

Apparatus constructed according to my invention serves needs in petroleum exploration such as providing data for charting the bounds of subterranean petroleum deposits and ascertaining the proper location for drilling operations. These and other objects of my invention will be evident from the following disclosures and the appended claims.

The ionization chamber may follow the general construction of any type of electroscope, electrometer, or other current or voltage measuring device.

When single shielding is used pure inactive lead may be employed, however, the shield may be of any particular single, multiple, or combination, of metallic, non-metallic, liquid, or gaseous types of construction having physical properties of shielding or causing the disintegration of radiant energy or causing secondary radiation.

When additional electrons, or negative charges, are added to the initially negatively electrostatically charged inner surface of the suitably shielded ionization chamber, resulting from the penetration to the ionization chamber of the penetrating radiant energy which emanates from subterranean petroleum deposits, those added charges produce corresponding positive charges on the ionization chamber electrode charge which causes a retardation in the dissipation of the electrode charge. This retardation is observed from the recordings of the amplified ionization chamber electrode charge during the time period the apparatus is in operation.

The apparatus may take the form of an ionization chamber, the charged electrode, electrodes, or insulated walls of which are connected to a shielded electronic amplification unit, through the intermediary of an extremely low loss condenser unit, or connected directly to an electronic amplifier. However, such an amplification unit must be so constructed that its operation will cause an extremely low loss of the ionization chamber charge. Other refinements, such as shielding of electrical components from all possibility of inducing primary or secondary charges, and the elimination of residual or bound charges, are essential to my apparatus for electronic amplification of the ionization chamber electrode charge.

The apparatus of this invention provides shielding so that from given locations on the earth's surface, the location of underground petroleum deposits and the best location for drilling operations may be determined.

The drawing shows a schematic illustration of the apparatus of my invention with an electronic amplification system for facilitating the detection and measurement of the radiant energy emanating from subterranean petroleum deposits by electronically recording and indicating the amplified ionization chamber electrode charge at all times when the apparatus is in operation.

The inclosing shield 16' surrounds the ionization chamber 4 and electrode 5' therein. The electrode 5' is a rod of brass or other suitable material extending axially into the ionization chamber 4 and is held in place and insulated from the walls of the ionization chamber 4 by insulator 6'. The electrode 5' extends through insulator 6' and both insulator 6' and the electrode 5' are extended to electronic amplification unit 22 within the inclosing shield 16', through the intermediary of an extremely low loss condenser unit, or connected directly to an electronic amplifier within the unit 22 inclosed in the shielded compartment 23 within the inclosing shield 16'. Any suitable power source such as 22a may be inclosed within compartment 23. Shield 24 is a suitable metallic shield, preferably pure inactive lead which shields the ionization chamber 4 from any primary or secondary charges which might be caused by the amplification unit 22. The inclosing shield 16' also shields amplification unit 22 against earthly radiant energy.

Passing through opening 25 in the inclosing shield 16' are insulated wires 26 from the electronic amplification unit 22 to a second electronic amplifier unit 27 which contains apparatus for additional stages of amplification and a current and voltage measuring and indicating device so that the relative values of the electrode charge may be observed or recorded at all times when the apparatus is in operation. The second amplifier unit 27 is outside the inclosing shield 16' in order to permit the inclosing shield 16' to shield from amplification unit 22 any induced primary or secondary charges that might be caused through the higher stages of electronic amplification employed in amplifier unit 27.

Connected to electronic amplifier unit 27 by insulated wires 28 is a conventional recording device 29 which provides recordings of the amplified positive electrostatic charge on the electrode 5' at all times during the operation of the apparatus.

The inclosing shield 16' rests on a stand or table 2 on or above the surface of the earth 3 although it may be placed in an excavation beneath the surface of the earth. The ionization chamber 4 shown in the drawing as one form of ionization chamber which may be used rests on the bottom side of the inclosing shield 16' and is the electroscope type of ionization chamber and is constructed from brass or other suitable metallic tubing with a meshed wire screen front and rear backed by glass. The ionization chamber, however, may be a metal inclosure containing air or gas at atmosphere or greater pressure and made wholly of metal and come within the scope and sphere of my invention.

The inclosing shield 16' diagrammatically represented is constructed of pure inactive lead of the single metal type, in other words solid lead.

The inclosing shield 16' may be extended downward as represented at 17' toward the earth 3. In shield 16' is an axial recess 18' extending upward toward the ionization chamber 4 to the bottom portion 19' of the inclosing shield 16'. The inclosing shield 16', including bottom portion 19' and top portion 20', has shielding capacity to shield the ionization chamber 4 and electronic amplification unit 22 from earthly ionizing radiation such as alpha, beta, gamma and other unwanted ionizing radiation found associated with the penetrating radiant energy emanating from petroleum deposits, all of which radiation accelerates the dissipation or decay of an ionization chamber charge, while the inclosing shield 16', except portions 19' and 20', also has shielding capacity sufficient to shield the ionization chamber 4 and electronic amplification unit 22 against the penetrating radiant energy emanating from subterranean petroleum deposits. I normally use a recess of two inches in diameter which has permitted sufficient petroleum deposit emanations to penetrate portion 19' of the inclosing shield 16' and on to the ionization chamber for efficient operation of the apparatus. The inclosing shield may be constructed and designed to adequately separate the two forms of radiant energy of varied intensities encountered in geophysical explorations.

Before engaging in field explorations a standard for use in making determinations from measurements obtained in the field under exploration, or normal rate of dissipation or decay of a positive electrostatic charge on the ionization chamber electrode 5' when shielded against earthly radiant energy, is determined.

In the field operation of my apparatus, the electrode 5' is manually given a positive electrostatic charge by contacting the positively electrostatically charged wire 8' to the electrode 5' and after the desired charge has been placed on the electrode 5' as reflected in the recording device 29 connected to electronic amplifier unit 27, the charged wire 8' is turned to the front or rear of the ionization chamber 4. Wire 8' is insulated from the ionization chamber 4 by insulator 9. The positive electrostatic charge is placed on the wire 8' by connecting the wire 8' to a charging unit outside of the apparatus and the wire 8' is disconnected from the charging unit after the electrode 5' has been given the desired charge. To place a positive electrostatic charge on the ionization chamber electrode 5', portion 20' of the inclosing shield 16' is removed and after the desired number of electrostatic units charge has been given the electrode 5' to permit operation of the apparatus, the wire 8' is turned and made to contact the front or rear of the ionization chamber 4 and portion 20' of the inclosing shield 16' is put back in place. This positive electrostatic charge on the ionization chamber electrode 5' will produce a corresponding negative charge on the surface of the inner walls of the ionization chamber 4.

In field operations at selected locations in the territory to be explored, the electrode 5' is given a positive electrostatic charge which produces a corresponding negative charge on the surface of the inner walls of the ionization chamber 4. The inner walls so charged are subjected to the radiant energy which emanates from subterranean petroleum deposits and petroleum deposit emanations encountered will pass through the recess 18' and penetrate portion 19' of the inclosing shield 16' and on to the ionization chamber 4 and cause negative charges, or electrons, to be added to the negatively charged surface of the inner walls of the ionization chamber 4 which produces corresponding positive charges on the ionization chamber electrode 5' which causes a retardation in the rate of dissipation or decay of the electrode charge over and above its normal rate of dissipation or decay. The electrode charge during the operation of the apparatus is amplified by amplification unit 22, within compartment 23 shielded from the ionization chamber 4 by shield 24, and further amplified by amplifying and indicating unit 27 which is connected to recording unit 29 which provides recordings of the ionization chamber electrode charge during the time period of operation of the apparatus. It is this retardation that is observed. In the absence of petroleum deposit emanations penetrating portion 19' of the inclosing shield 16' no retardation will be observed.

A recording is made of the amplified value of the electrode charge obtained during the time period of operation of the apparatus and that value is compared with the value of the electrode charge recorded for a like time period when obtaining the normal rate of dissipation at point of exploration. Any retardation noted evidences the presence, and the extent or amount of such retardation evidences the relative amount of the radiant energy encountered from the projected area of the subterranean petroleum deposit.

With this apparatus providing the means whereby relative values of the radiant energy emanating vertically upward or nearly so from the petroleum deposits may be detected and measured, the apparatus is placed at selected locations on the surface of the earth in the territory to be explored and the negatively electrostatically charged inner surface of the ionization chamber 4 is subjected to the radiant energy emanating from subterranean petroleum deposits. If the petroleum deposit emanations encountered are so intense that the ionization chamber charge will not dissipate within a reasonable time, apparatus employing other shielding may be used.

In the foregoing description and explanation of my invention I have utilized certain specific forms of construction to more clearly explain the principles upon which it operates, and to so fully describe one form of my invention that construction and proper use of the apparatus will effectively demonstrate the theory, the use, and the utility of my invention.

It is emphatically stated that all metals used in the construction of the apparatus described in this application must be pure, inactive and absolutely free from any entrapped energy or bound electrical charges.

Obviously many other modifications and variations of the invention as hereinbefore set forth may be made without departing from the spirit and scope thereof, and therefore only such limitations should be imposed as are indicated by the appended claims.

What I claim and desire to secure by Letters Patent of the United States is as follows:

1. Apparatus for detecting radiant energy emanating from subterranean petroleum deposits encountered in geophysical explorations for locating subterranean petroleum deposits, comprising an ionization chamber, shielding surrounding the ionization chamber for shielding said chamber against earthly radiant energy except for a portion of said shielding between the ionization chamber and the earth's surface with the excepted portion of the surrounding shielding substantially impervious to earthly ionizing radiation incident upon said portion, and electronic means for measuring the change in the ionization chamber charge during the operation of the apparatus.

2. Apparatus for measuring radiant energy emanating from subterranean petroleum deposits encountered in geophysical explorations for locating subterranean petroleum deposits, comprising an ionization chamber with an electrode extending therein, shielding surrounding the ionization chamber for shielding said chamber against earthly radiant energy except for a portion of said shielding between the ionization chamber and the earth's surface with the excepted portion of the surrounding shielding substantially impervious to earthly ionizing radiation incident upon said portion, and electronic means for measuring the relative amount of petroleum deposit emanations encountered from a limited area of the earth's substrata.

3. A method for detecting radiant energy emanating from subterranean petroleum deposits that comprises surrounding an ionization chamber with shielding against earthly radiant energy except for a portion of said shielding between the chamber and the earth's surface which excepted portion of the surrounding shielding shields the ionization chamber from earthly ionizing radiation, charging negatively electrostatically the inner surface of said chamber, subjecting said shielded chamber to the radiant energy emanating from subterranean petroleum deposits, determining electronically the rate of dissipation of the charge on the inner surface of said chamber, comparing that rate of dissipation with the rate of dissipation of a similar negative electrostatic charge on the inner surface of said chamber when shielded against radiant energy emanating from subterranean petroleum deposits, the presence of petroleum deposit emanations encountered from a limited area of the earth's substrata being detected thereby.

4. A method for measuring radiant energy for the relative amount of subterranean petroleum deposit emanations encountered in geophysical explorations that comprises surrounding an ionization chamber with shielding against earthly radiant energy except for a portion of said shielding between the chamber and the earth's surface which excepted portion of the surrounding shielding shields the ionization chamber from earthly ionizing radiation, charging negatively electrostatically the inner surface of said chamber, subjecting said chamber to the radiant energy emanating from subterranean petroleum deposits, determining electronically the change of charge on the inner surface of said chamber, comparing that change of charge on the inner surface of the chamber with the change of a similar negative electrostatic charge on the inner surface of the chamber when shielded against radiant energy emanating from subterranean petroleum deposits, the relative amount of petroleum deposit emanations encountered from a limited area of the earth's substrata being measured thereby.

5. A method for detecting subterranean petroleum deposit emanations that comprises surrounding an ionization chamber with shielding against earthly radiant energy except for a portion of said shielding between the chamber and the earth's surface which excepted portion of the surrounding shielding shields the ionization chamber from earthly ionizing radiation, charging positively electrostatically an electrode in said chamber, subjecting said shielded chamber to the radiant energy emanating from subterranean petroleum deposits, determining electronically the rate of dissipation of the electrode charge, comparing that rate of dissipation with the rate of dissipation of a similar positive electrostatic charge on the electrode when shielded against radiant energy emanating from subterranean petroleum deposits, the presence of petroleum deposit emanations encountered from a limited area of the earth's substrata being detected thereby.

6. A method for measuring radiant energy for the relative amount of subterranean petroleum deposit emanations encountered in geophysical explorations that comprises surrounding an ionization chamber with shielding against earthly radiant energy except for a portion of said shielding between the chamber and the earth's surface which excepted portion of the surrounding shielding shields the ionization chamber from earthly ionizing radiation, charging positively electrostatically an electrode in said chamber, subjecting said shielded chamber to the radiant energy emanating from subterranean petroleum deposits, determining electronically the change of charge on said electrode, comparing that change of charge on the electrode with the change of a similar positive electrostatic charge on the electrode when shielded against radiant energy emanating from subterranean petroleum deposits, the relative amount of the petroleum deposit emanations encountered from a limited area of the earth's substrata being measured thereby.

WALTER ARMSTRONG.

REFERENCES CITED

The following references are of record in the file of this patent:

UNITED STATES PATENTS

| Number | Name | Date |
| --- | --- | --- |
| 2,296,176 | Neufeld | Sept. 15, 1942 |
| 2,316,361 | Piety | Apr. 13, 1943 |

OTHER REFERENCES

"Radiology," vol. 27, 1936 (2) pp. 149–157.

Harrington, "Scientific American," September 1935, pp. 131 and 132.